United States Patent [19]

Knoerzer

[11] Patent Number: 5,508,113
[45] Date of Patent: Apr. 16, 1996

[54] PVOH-BASED COATING COMPOSITION COATED POLYMERIC FILM

[75] Inventor: Anthony R. Knoerzer, Plano, Tex.

[73] Assignee: Mobil Oil Corp., Fairfax, Va.

[21] Appl. No.: 342,063

[22] Filed: Nov. 18, 1994

[51] Int. Cl.$^6$ .............................. B32B 27/08; B32B 7/10; B32B 27/32
[52] U.S. Cl. ........................ 428/500; 428/516; 428/518; 428/520; 428/36.6; 428/36.7
[58] Field of Search ..................................... 428/500, 516, 428/518, 520, 523, 36.6, 36.7

[56] References Cited

U.S. PATENT DOCUMENTS

| | | | |
|---|---|---|---|
| 2,760,942 | 8/1956 | Oakley | 428/349 |
| 3,148,166 | 9/1964 | Suzumura et al. | 428/500 |
| 3,152,102 | 10/1964 | Suzumura et al. | 525/60 |
| 3,232,916 | 2/1966 | Fogle | 525/56 |
| 3,250,748 | 5/1966 | Suzumura et al. | 525/61 |
| 3,597,215 | 8/1971 | Abel et al. | 430/628 |
| 3,719,629 | 3/1973 | Martin et al. | 523/456 |
| 4,131,581 | 12/1978 | Coker | 428/507 |
| 4,214,039 | 7/1980 | Steiner et al. | 428/520 |
| 4,222,922 | 9/1980 | Rees | 524/215 |
| 4,238,379 | 12/1980 | Reinhart, Jr. | 428/436 |
| 4,247,624 | 1/1981 | Foss | 430/281 |
| 4,251,403 | 2/1981 | Rees | 428/295 |
| 4,262,067 | 4/1981 | Philipp et al. | 429/139 |
| 4,293,473 | 10/1981 | Eastman | 524/98 |
| 4,340,686 | 7/1982 | Foss | 525/59 |
| 4,564,559 | 1/1986 | Wagner, Jr. et al. | 428/518 |
| 4,564,649 | 1/1986 | Hume, III et al. | 428/507 |
| 4,565,742 | 1/1986 | Lang | 428/518 |
| 4,608,111 | 8/1986 | Hume, III et al. | 150/306.6 |
| 4,623,412 | 11/1986 | Bohme et al. | 428/530 |
| 4,719,147 | 1/1988 | Mauri | 428/518 |
| 4,752,559 | 6/1988 | Helland et al. | 430/510 |
| 4,770,944 | 9/1988 | Farrell et al. | 428/518 |
| 4,794,136 | 12/1988 | Touhsaent | 428/516 |
| 4,816,342 | 3/1989 | Farrell et al. | 428/522 |
| 4,927,689 | 5/1990 | Markiewicz | 428/518 |
| 4,927,801 | 5/1990 | Mahmud | 428/913 |
| 5,017,430 | 5/1991 | Chu et al. | 428/516 |
| 5,059,264 | 10/1991 | Sheets | 428/151 |
| 5,093,194 | 3/1992 | Touhsaent et al. | 428/518 |
| 5,102,699 | 4/1992 | Beeson et al. | 428/518 |
| 5,151,331 | 9/1992 | Beeson et al. | 428/520 |
| 5,200,455 | 4/1993 | Warren | 524/413 |
| 5,225,288 | 7/1993 | Beeson et al. | 428/518 |
| 5,229,217 | 7/1993 | Holzer | 428/503 |
| 5,230,963 | 7/1993 | Knoerzer | 428/520 |
| 5,252,384 | 10/1993 | Bothe et al. | 428/212 |
| 5,254,394 | 10/1993 | Bothe et al. | 428/516 |
| 5,286,424 | 2/1994 | Su et al. | 264/23 |
| 5,330,831 | 7/1994 | Knoerzer et al. | 428/520 |
| 5,380,586 | 1/1995 | Knoerzer et al. | 428/518 |

OTHER PUBLICATIONS

T. W. Modi, *Polyvinyl Alcohol*, in Handbook of Water-Soluble Gums and Resins, 20.1–20.32 (Robert L. Davidson ed., 1980).

Harold L. Jaffe and Franklin M. Rosenblum, *Poly(vinyl Alcohol) for Adhesives*, in Handbook of Adhesives 401–407 (Irving Skeist ec., 1990).

*Primary Examiner*—Tae Yoon
*Attorney, Agent, or Firm*—Alexander J. McKillop; Dennis P. Santini

[57] ABSTRACT

Coating compositions which have improved oxygen and flavor/odor barrier characteristics are disclosed. The coating compositions are obtained by coating a polymeric substrate with an aqueous solution of polyvinyl alcohol and urea and drying the coating at a temperature sufficient to allow the polyvinyl alcohol and urea to crosslink such that urethane linkages are formed at least between the polymeric substrate and the coating composition. Polymeric film structures including coating compositions and a method of making the same are also disclosed.

12 Claims, No Drawings

PVOH-BASED COATING COMPOSITION COATED POLYMERIC FILM

BACKGROUND OF THE INVENTION

The present invention relates to coating compositions which are based on poly(vinyl alcohol) ("PVOH") and which provide enhanced oxygen and flavor/odor barrier characteristics.

Attempts have been made in the past to produce waterborne adhesive coating compositions including PVOH for use on hydrophobic polymeric substrates. For example, one PVOH containing coating is obtained by reacting PVOH with isocyanate or blocked isocyanate to form a coating which is adherent to polyolefins, but also contains residual, ureacted toxic isocyanates. As a result, such coating cannot be used in food packaging applications.

Certain polymeric films employed for the packaging of foods inherently permit the transmission of oxygen from the atmosphere to the inside of the packaged food. Oxygen causes the spoilage of packaged food by oxidation.

PVOH coatings, have been applied to various substrates in the past, and are known to provide a barrier to the transmission of oxygen. In certain applications, such as condiments packaging, PVOH has been used to prevent the flavor of condiments from passing through the packaging. In other applications, PVOH containing polymeric films have been used to protect the packaged food contents against acquisition of odors or even other flavors from the outside the packaging.

Polyvinyl alcohols are polymers containing ($-CH_2-CHOH-$) groups. They can be applied from water solution and are in many respects attractive materials for use as oxygen and flavor/odor barrier coatings for thermoplastic polymer substrates. However, PVOH is soluble in water and, as a result, susceptible to attack by moisture. The poor water resistance of PVOH restricts its use as a barrier coating to those few applications in which nearly anhydrous conditions prevail. Moisture may act to cause staining or wear due to friction, an unpleasant feel to the touch and a dull appearance. It is also known that oxygen and flavor/odor permeability of PVOH coatings increases in proportion to its moisture content.

A number of methods have been known for increasing the water resistance of PVOH, but none provides entirely satisfactory results. In spite of various heretofore practiced methods, PVOH still tends to soften, swell and lose adhering strength when exposed to water or even moisture vapor. When applied to hydrophobic surfaces, such as polyolefins, coatings including PVOH do not adhere well and are not moisture resistant. As a result, the polymeric substrate surface must be coated with a primer coating first and then covered with the PVOH containing coating. Thus, there is not presently available a single coating composition which acts as both a primer and a barrier. The coatings known to date which are used to increase or enforce barrier characteristics generally require a primer to improve adhesion or binding between the barrier coating and the film.

Accordingly, a coating composition with high oxygen and flavor/odor barrier which is moisture resistant and is directly applicable to hydrophobic substrates without the necessity of a primer coating is highly desirable.

It is, therefore, an object of the present invention to provide a PVOH containing coating composition which has high oxygen and flavor/odor barrier characteristics, is moisture resistant and is directly applicable to hydrophobic polymeric substrates without the requirement of a primer coating.

It is yet another object of the present invention to provide a PVOH containing coating composition which not only adheres tenaciously to hydrophobic polymeric substrates, but is also tacky and can be used as a primer coating for subsequently applied coatings.

SUMMARY OF THE INVENTION

The present invention, which addresses the needs of the prior art provides coating compositions which have oxygen and flavor/odor barrier characteristics for coating surface treated polymeric substrates bearing no primer coating.

More specifically, it has now been found that by drying a solution of PVOH and urea at temperatures which allow PVOH to react with urea, primer coating compositions are obtained which have heretofore unknown oxygen barrier characteristics. During the drying of the PVOH/urea solution, the PVOH and urea become crosslinked, and urethane linkages are formed at least with the polymeric substrate. The resulting coating compositions are no longer water soluble, adhere tenaciously to hydrophobic polymeric surfaces, preferably polyolefins and have excellent oxygen and flavor/odor barrier characteristics.

PVOH and urea may be provided in an aqueous solution or in another ionic solvent. Aqueous solutions of PVOH and urea are preferred.

Films coated with the compositions of the present invention exhibit superior oxygen and flavor/odor barrier characteristics. The coating compositions of the present invention are preferably applied to surface treated hydrophobic polyolefins, for example, polypropylene, low density polyethylene, linear low density polyethylene and high density polyethylene. The surface treatment is accomplished by well known methods in the art, corona and flame treatment being preferred.

The polymeric substrate upon which the coating compositions of the present invention is applied may include a coextruded skin on at least one side thereof, which may be a $C_2$-$C_4$ homopolymer, propylene-ethylene copolymer, and polyethylene-polybutenepolypropylene terpolymer.

The present invention also provides a process of preparing polymeric film structures having enhanced oxygen and flavor/odor characteristics. The process includes coating at least one surface of the corona or flame treated polymeric substrate with an aqueous solution of PVOH and urea and drying the coating at temperatures which induce urethane linkages to be formed between a hydrophobic polymeric substrate and the coating composition.

The PVOH used in providing the coating composition of the present invention is from about 80% hydrolyzed to about 99.6% hydrolyzed. A preferred coating composition results from using a blend of from about 40% to about 80% by weight of PVOH which is 99.6% hydrolyzed and from 20% to about 60% by weight of PVOH which is 86% hydrolyzed. The most preferred coating composition contains a blend of 60% by weight of PVOH which is 99.6% hydrolyzed and 40% by weigh of PVOH which is 86% hydrolyzed.

The amount of urea useful for the coating composition of the present invention is from about 1% to about 20% by weight of the coating composition, wherein from about 5% to about 10% by weight of urea is preferred and about 7% by weight of urea is most preferred. To improve the coefficient of friction of the coating composition of the present invention, acrylic acid can be added in the aqueous solution of PVOH and urea in an amount from about 1% by weight to about 20% by weight of the coating composition. As a preferred embodiment, from about 5% to about 15% by weight of acrylic acid is included in the PVOH/urea aqueous solution.

As a result of the present invention, primer coating compositions are provided which have excellent oxygen and flavor/odor barrier characteristics are moisture resistant and are directly applicable to substrates without the necessity of a primer coating. The coating compositions of the present invention have been found to be especially useful as primer coatings for hydrophobic polymeric substrates, preferably polyolefins. By providing a single coating composition which acts both as a primer and also as an oxygen and flavor/odor barrier significant cost savings can be realized.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The coating compositions of the present invention when applied to a suitable substrate, such as oriented polypropylene, provide a combination of primer characteristics and improved barrier characteristics which have been hitherto unavailable in a single coating component. Consequently the adhesion, gloss and/or durability of subsequently applied top coatings such as, for example, heat sealable acrylic is improved.

The coating compositions of the present invention are used mainly as primers. The term "primer" as used in the present invention means a coating applied to a substrate to improve the adhesion, gloss and/or durability of a subsequently applied coating.

The coating compositions of the present invention are prepared by dissolving PVOH and urea in an ionic solvent, preferably water. The solution thus obtained is applied onto a suitable substrate and then the coating is dried to drive off the solvent at temperatures sufficient to allow PVOH to react with urea thereby forming urethane linkages with the substrate. A useful temperature range is from about 200° F. to about 300° F. The range of from about 250° F. to about 275° F. is preferred.

The term "urethane linkages" as used herein refers to any functionality that has one nitrogen, carbon, hydrogen and two oxygens formed during crosslinking, wherein the elements are most likely linked through covalent bonding. In the present invention crosslinking occurs while the PVOH/urea solution is dried, urethane linkages are formed not only between PVOH and urea, but also with molecules of the substrate and/or the top coating. As a result, the primer of the present invention is no longer moisture sensitive and is also tacky.

"Polyvinyl alcohol" as used herein means a normally solid polymeric material, soluble in water, but insoluble in most organic solvents and characterized by the presence of ($-CH_2-CHOH-$) units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis of the PVOH thus formed and indicates the percent of hydroxyl groups present in PVOH out of the total possible hydroxyl groups. As explained hereinbelow the crosslinking reaction by which the superior barrier coatings of this invention are obtained proceeds through the hydroxyl groups of PVOH. Therefore, the PVOH useful in the present invention should have a degree of hydrolysis from about 80% hydrolyzed to about 99.6% hydrolyzed. A PVOH blend of from about 40% to about 80% of PVOH which is 99.6% hydrolyzed and from about 20% to about 60% by weight PVOH which is 86% hydrolyzed, respectively, is particularly preferred because such blend provides superior resistance, clarity, flexibility and adhering strength. Most preferred is a PVOH blend of 99.6% hydrolyzed and 86% hydrolyzed in a ratio of 60:40, respectively.

The PVOH employed herein can be any commercially available material. For example, ELVANOL 71-30 or ELVANOL 90-30 are E. I. dupont products.

Urea is a white, crystalline water soluble compound which, because of its reactivity and versatility is manufactured in large quantities. The urea employed herein can be any commercially available material. For example, urea supplied by Aldrich Inc. may be used in the coating compositions of the present invention. The amount of urea useful in the present invention is from about 1 dry wt. % to about 20 dry wt. % with from about 5 dry wt. % to about 15 dry wt. % being preferred and about 7 dry wt. % is most preferred.

The polymeric materials contemplated as the substrate of the multilayer structure of the present invention include any polymeric film oriented or unoriented which inherently permits the transmission of oxygen and flavor/odors and wherein the utility of such film would call for decreasing the transmission of oxygen and flavor/odors. In most cases, the source of the oxygen referred to herein is atmospheric oxygen. While nylon, polyethylene terephthalate ("PET"), polycarbonate films are contemplated for use herein, a particularly preferred class of films are the polyolefins. Within the polyolefin class, homopolymers and copolymers of propylene, low density polyethylene ("LDPE"), linear low density polyethylene ("LLDPE") and high density polyethylene ("HDPE") are preferred. Particularly preferred are isotactic polypropylenes containing at least 80% by weight of isotactic polypropylene. The preferred substrate layer can be homopolypropylene having a melting point range of from about 321°–336° F. A commercially available material of this description is ARCO W472 brand polypropylene.

The preferred substrate layer can also be coextruded with a thin skin layer, amounting to from about 2 to about 12% of the total thickness of the substrate. The skin may be made of a propylene homopolymer, a copolymer of propylene with another olefin, e.g., ethylene or butene-1, and a terpolymer of polethylene-polybutene-polypropylene. The other olefin which can be present in the copolymer is in an amount of from about 1 wt % to about 15 wt %.

The polymeric substrate can be of any desired thickness, although thicknesses will typically range from about 0.5 to about 2 mils to ensure good machinability on high-speed packaging equipment. The oriented polypropylene ("OPP") film should preferably have a thickness of 1.0 mil.

It has been found advantageous to treat the substrate or base layer prior to receiving the oxygen and moisture barrier layers. Such treatment enhances the adhesion of other coatings, including that of a primer.

A preferred treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

After this treatment, the coating compositions of the present invention may be applied in-line after the polymeric substrate has been stretched in the machine direction (MD) but prior to orientation in the transverse direction (TD). Thereafter, the coating composition is dried by passing the film through tenter ovens.

The coating compositions of the present invention may also be applied to the polymeric substrate by using an off-line process. Off-line application includes coating in any convenient and known manner, such as dipping, spraying, brushing, role coating, gravure coating, and the like.

It has been found that the coating compositions of the present invention are heat sealable when applied to a hydrophobic polymeric substrate in excess of 190 grams/inch. A film structure with enhanced heat seal characteristics may be used for the inside surface of packaging films.

Other materials may be added directly to the aqueous solution of PVOH and urea in order to realize special advantages in addition to excellent oxygen barrier characteristics. To improve the hot slip characteristics of the coating, additional crosslinkers can be added directly to the aqueous solution of urea and PVOH. For example, melamine formaldehyde, urea formaldehyde resin, methylated melamine formaldehyde may be added to the coating composition of the invention in the presence of sulfuric acid as the crosslinker catalyst as more fully described in commonly owned U.S. Ser. No. 08/080,602 filed on Jun. 23, 1993. By adding additional crosslinkers the moisture sensitivity of PVOH is further reduced.

Ethylene acrylic copolymer ("EAA") may be added in an amount from 1 wt. % to about 20 wt. % to improve the coefficient of friction of the coating. The resulting film has excellent slip characteristics and it can be wound up efficiently on packaging machinery.

The addition of EAA in excess of 20 wt. % results in a reduction of the heat sealable characteristics of the film. To render the film structure of the present invention heat sealable a coating of acrylic acid, commonly called acrylic, amorphous PVdC, or EAA/acrylic blends, extrusion applied terpolymers, cast polypropylene or cast polyethylene may be applied over the adhesive coating composition of the present invention.

In another embodiment of the present invention, the polymeric substrate includes a skin on both surfaces. In yet another embodiment the coating composition of the present invention is applied onto both surfaces of the substrate. A layer of acrylic may also be applied on both surfaces of the primer coated polymeric substrate.

EXAMPLES

The following examples serve to provide further appreciation of the invention but are not meant in any way to restrict the effective scope of the invention.

Example 1

A homopolymer polypropylene core layer was coextruded with skin layers of an ethylene-propylene random copolymer. The random copolymer contains approximately 3–5% by weight of ethylene. The extruded film was biaxially oriented to 4–5 times machine direction and 7–10 times transverse direction to yield a film having a thickness of approximately 1 mil. The thickness of the skin layers was approximately 12% of the film. The skin layers were approximately of equal thickness. This film combination was corona discharge treated in accordance with commonly employed prior art techniques to produce a surface with a wetting tension of about 42 dynes/cm. The treated film was coated on both sides with 0.1% of an aqueous solution of PVOH and urea. The solution contains 93 wt. % of a blend of 99.6% hydrolized PVOH and 86% hydrolyzed PVOH in a ratio of 60:40, respectively, and 7 wt. % urea. The resulting coated film was then dried at temperatures between 200° F. and 300° F.

The dried films were then tested in an oxygen-permeability device in which a stream of dry oxygen is passed through an aqueous salt solution-permeated pad to control the gas moisture content and then through the films, disposed at right angles to the stream with the crosslinked PVOH coating upstream. The oxygen transmitted was determined and the amount of oxygen passed per unit area of film per time period was calculated.

TABLE 1

| FILM STRUCTURE | FILM[1] THICKNESS | COATING COMPOSITION | THICKNESS OF[1] BARRIER LAYER | $TO_2{}^2$ | $TO_2{}^3$ | HEAT SEAL[4] |
|---|---|---|---|---|---|---|
| Coated | 1.00 | Primer PEI Top Coat: Acrylic | 0.04 | 150 | 150 | 600 |
| Coated Substrate | 1.00 | Primer: PVOH/urea Top Coat: None | 0.04 | 0.86 | 2.1 | 300 |
| Coated Substrate | 1.00 | Top Coat: Acrylic Primer: PVOH/urea | 0.08 | 0.86 | 2.1 | 450 |

[1]The thickness is measured in mil.
[2]Average oxygen transmission rate measured in cc/100 in$^2$/24 hr. at 75° F., 0% RH.
[3]Average oxygen transmission rate measured in cc/100 in$^2$/24 hr. at 75° F., 75% RH.
[4]Heat seal is measured in grams/in.

As illustrated in Table 1, an uncoated OPP film structure shows a high oxygen transmission rate due to poor oxygen barrier properties.

The oxygen transmission rate is significantly decreased by the addition of a coating of PVOH crosslinked with urea. The average oxygen transmission rate of a substrate coated with the primer of the present invention is superior to an uncoated OPP film, or a film coated with acrylic coating. At higher relative humidity, namely 75° F, 75% RH the oxygen barrier characteristics are also superior to those of an OPP film coated with twice the coating weight of acrylic.

Thus, Table 1 shows that the resulting primer coating compositions obtained by the methods of the present invention exhibit excellent and unexpected oxygen and flavor/odor barrier characteristics, are moisture resistant and can be applied directly to corona or flame treated surfaces. Film structures incorporating the primer of the present invention not only show excellent oxygen and flavor/odor barrier characteristics, but are also more economical to produce. The properties of two separate coatings, namely those of a primer and those of an oxygen-barrier film are now present into one single coating.

Thus, while there have been described what are presently believed to be the preferred embodiments of the present invention, those skilled in the art will realize that other and further modifications can be made without departing from the true spirit of the invention and is intended to include all such modifications and variations as come within the scope of the claims as set forth below.

I claim:

1. A polymeric film structure which comprises:
   (i) a corona discharge or flame treated, hydrophobic polyolefin substrate;
   (ii) a moisture resistant primer coating composition on at least one surface of said corona treated hydrophobic polyolefin substrate, said moisture resistant coating composition comprising polyvinyl alcohol and urea crosslinked with each other and such that urethane linkages are formed at least between said hydrophobic polyolefin substrate and said coating composition, whereby a polymeric structure having oxygen and flavor/odor barrier characteristics is obtained.

2. The polymeric film structure of claim 1, wherein said polyolefin substrate is selected from the group consisting of polypropylene, low density polyethylene, linear low density polyethylene, and high density polyethylene.

3. The polymeric film structure of claim 1, wherein said polyvinyl alcohol is from about 80% hydrolyzed to about 99.6% hydrolyzed.

4. The polymeric film structure of claim 1, wherein said polyvinyl alcohol is a blend of from about 40% to about 80% by weight polyvinyl alcohol which is 99.6% hydrolyzed and from about 20% to about 60% by weight polyvinyl alcohol which is 86% hydrolyzed.

5. The polymeric film structure of claim 1, wherein said coating composition comprises from about 1% to about 20% by weight urea.

6. The polymeric film structure of claim 1, wherein said coating composition comprises from about 5% to about 10% by weight urea.

7. The polymeric film structure of claim 1, further comprising a heat-sealable coating over said primer coating, said heat-sealable coating selected from the group consisting of acrylic acid, polyvinylidene chloride, ethylene acrylic acid copolymer/acrylic blends, cast polypropylene, polyethylene and mixtures thereof.

8. The polymeric film structure of claim 1, wherein said substrate includes a coextruded skin on at least one side thereof.

9. The polymeric film structure of claim 8, wherein said coextruded skin is selected from a group consisting of $C_2$–$C_4$ homopolymer, propylene-ethylene copolymer, and polyethylene-polybutene-polypropylene terpolymer.

10. The polymeric film structure of claim 1, wherein said moisture resistant primer coating composition further comprises ethylene acrylic acid copolymer.

11. A polymeric film structure which comprises:
    (i) a corona or flame treated, hydrophobic polyolefin substrate;
    (ii) a moisture resistant primer coating composition on at least one surface of said corona treated hydrophobic polyolefin substrate, said moisture resistant coating composition consisting essentially of polyvinyl alcohol, urea and ethylene acrylic acid copolymer crosslinked such that urethane linkages are formed at least between said hydrophobic polyolefin substrate and said coating composition, whereby a polymeric structure having enhanced oxygen, flavor/odor barrier and slip characteristics is obtained.

12. The polymeric film structure of claim 11, wherein said polyvinyl alcohol is a blend of from about 40% to about 80% by weight polyvinyl alcohol which is 99.6% hydrolyzed and from about 20% to about 60% by weight polyvinyl alcohol which is 86% hydrolyzed whereby a polymeric structure bearing oxygen and flavor/odor barrier characteristics is obtained.

\* \* \* \* \*